United States Patent [19]

Turner

[11] 4,283,510

[45] Aug. 11, 1981

[54] POLYCHLOROPRENE TREATED WITH ALKYLATED DIARYL AMINE

[75] Inventor: Nathan L. Turner, Houston, Tex.

[73] Assignee: Denka Chemical Corporation, Houston, Tex.

[21] Appl. No.: 575,110

[22] Filed: May 6, 1975

Related U.S. Application Data

[63] Continuation of Ser. No. 144,277, May 17, 1971, abandoned.

[51] Int. Cl.³ ............................. C08C 3/00; C08F 2/26
[52] U.S. Cl. .............................. 525/379; 260/45.9 QB; 526/225; 526/295
[58] Field of Search ............ 260/92.3, 85.5 XA, 86.3, 260/29.7 SQ, 45.9 R; 526/49; 525/379

[56] References Cited

U.S. PATENT DOCUMENTS

| | | | |
|---|---|---|---|
| 2,530,769 | 11/1950 | Hollies | 252/401 |
| 2,576,909 | 12/1951 | Adams | 260/85.1 |
| 3,397,173 | 8/1968 | Collette | 260/45.9 |
| 3,535,292 | 10/1970 | Castrantas | 260/78.5 |
| 3,535,292 | 10/1970 | Castrantes | 260/78.5 |

OTHER PUBLICATIONS

Naugatuck Bulletin, "Octamine".

*Primary Examiner*—C. A. Henderson
*Attorney, Agent, or Firm*—Kenneth H. Johnson

[57] ABSTRACT

Addition of alkylated diarylamines to improve polychloroprene produced without using the salts of the condensation product of naphthalene sulfonic acids and formaldehyde.

10 Claims, No Drawings

POLYCHLOROPRENE TREATED WITH ALKYLATED DIARYL AMINE

This application is a continuation of copending application Ser. No. 144,277 filed May 17, 1971, now abandoned.

Neoprene, or polychloroprene, is conventionally polymerized in emulsion polymerization utilizing a combination of emulsifying agents. Conventionally, emulsifying agents are such as rosin acid salts and various secondary emulsifiers. Some of the emulsifying agents may remain in the polymer but certain water soluble emulsifiers are substantially removed before final isolation and processing of the polymer. These emulsifiers that are removed are sometimes referred to as secondary emulsifiers. For example, the polymer may be recovered by coagulation of the latices and thereafter the water soluble emulsifiers removed before final milling. The water soluble emulsifiers are removed, for example, by washing the polymer with warm water on a wash belt. This washing may be assisted by extraction by use of solvents which dissolve the emulsifying agents but which do not dissolve the polymer e.g. solvents such as alcohol. Normally, the washing requires the use of large volumes of water and if the emulsifying agents are biodegradable this water may be processed by bio-oxidative dehydrogenation; however, if the wash water contains non-biodegradable emulsifying agents elaborate and expensive procedures must be employed to remove the non-biodegradable emulsifiers prior to treatment of the wash water in a bio-oxidative degradation system to remove the biodegradable emulsifiers. It is an object of this invention to eliminate this costly processing of the wash water to remove non-biodegradable emulsifiers.

In the polymerization of chloroprene, it has been the practice to include as one of the emulsifiers a salt of the condensate product of naphthalene sulfonic acids and formaldehyde such as disclosed in U.S. Pat. Nos. 2,046,757 and 2,264,173. This type of emulsifier is employed to increase the stability of latices especially when the emulsion contains high concentration of electrolytes or in instances in which the other emulsifying agents are poor dispersing agents for the solid polymer. The formaldehyde-naphthalene sulfonic acid condensation products are excellent emulsifiers and, accordingly, have been incorporated in commercial recipes. However, these emulsifiers are washed out of the polymer and are for practical purposes non-biodegradable because the aromatic portion of the salt renders it immune or very resistant to bacteriological decay.

In my copending application Ser. No. 144,226 now U.S. Pat. No. 3,759,886 filed on even date herewith entitled "Biodegradable Emulsifiers for Polychloroprene" it is disclosed and claimed that the salts of the condensation product of naphthalene sulfonic acid and formaldehyde may be eliminated from the polymerization system by substituting octyl sulfate salts. As disclosed in the copending application, the resultant polymers of chloroprene have excellent physical characteristics. However, it has been discovered that the polychloroprene produced in the absence of the salts of the condensation product of napthalene sulfonic acid and formaldehyde are sometimes inferior to those produced with these emulsifiers in regard to Brabender stability. The Brabender stability is a measure of the resistance of the polymer to cross-linking resulting from high temperature mastication. This test is run with a Brabender Plastograph (manufactured by C. W. Brabender Instruments Inc.) which is an instrument to measure the torque required to mix or masticate the polymer at a given temperature. The stability is indicated by the time required for the sample to gel to a 100-meters-gram rise above the minimum torque.

The reason for the reduced Brabender stability for the polychloroprenes manufactured in the absence of naphthalene sulfonic acid condensation products is not known. Perhaps the residual naphthalene sulfonic acid condensation products remaining in the polymer are acting as stabilizers for the polychloroprene. On the other hand, it is known that emulsifiers affect such variables as the particle size of the polymer and in view of the uncertainty regarding the various influences of the emulsifiers during polymerization or during acidification it is difficult to speculate on the reasons for the stability of polymers produced using the salts of the condensation product of naphthalene sulfonic acids and formaldehyde. Regardless of the reasons for the effect on stability, applicant does not wish to be limited to any theory of the invention.

According to this invention it has been discovered that the stability of polymers produced in the absence of the salts of the naphthalene sulfonic acid condensation products with formaldehyde can be improved by adding alkylated diaryl amines to the polymers. Alkylated diaryl amines have previously been added to polychloroprenes such as an antioxidant. However, the salts of the condensation product of naphthalene sulfonic acid and formaldehyde are conventional emulsifiers for use during the polymerization or recovery of polychloroprene and it has not been known that the alkylated diaryl amines could specifically be used to stabilize the polychloroprenes produced in the absence of the salts of the naphthalene sulfonic acid. condensations with formaldehyde. As will be shown below, other antioxidants have not effectively stabilized the polychloroprene. Further, the alkylated diarylamines represent only one class of amine stabilizer.

A preferred feature of this invention is the use of the alkylated diaryl amines as stabilizers for polychloroprenes produced using alkyl sulfate salts as emulsifiers. The alkyl sulfate salts represent a preferred class of emulsifiers to be substituted for the salts of the condensation product of the naphthalene sulfonic acid and formaldehyde and the alkylated diaryl amines have been found to be particularly advantageous when combined with these alkyl sulfate salts. Expecially preferred as the alkyl sulfate salts are the octyl sulfate salts such as the alkali metal or ammonium octyl sulfate emulsifiers.

The alkylated diaryl amines are compounds of the formula

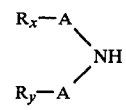

wherein A is an aryl group having one or two aromatic rings, R is an alkyl radical having from one to 12 carbon atoms but preferably having from 4 to 10 carbon atoms, x and y are whole numbers from 0 to 2 and $x+y$ must be at least one. For example, A may be phenyl or naphthyl and R may be such as methyl, ethyl, propyl, n-butyl, isobutyl, 2-ethyl hexyl, n-octyl, 2,5-dimethyl hexyl, dodecyl and the like. Either one or both of the aryl groups may be alkylated or the composition may represent a mixture of mono and dialkyl diaryl amines. The preparation of amines of this type is known and compounds are available under the tradenames of Agerite Stalite, Agerite Stalite S, Octamine and Pennox A. One preferred class of compounds is the reaction product of diisobutylene and diphenyl amine and these compounds are available under the tradename of Octamine (manufactured by Naugatuck, approximately 85–90 weight percent dioctyldiphenyl amine and 10–15 percent monooctyldiphenyl amine with the octyl groups being the diisobutylene radical) and Agerite Stalite (manufactured by R. T. Vanderbilt Co., approximately 94–98 weight percent dioctyldiphenyl amine and 2–6 percent monooctyldiphenyl amine).

The quantity of alkylated diarylamine used is not critical but certain proportions are preferred. Generally, from about 0.005 to 1.0 or 2.0 parts or higher amine compound per 100 parts by weight of chloroprene polymer is employed but preferred portions are such as from 0.01 to 0.1, and more preferably from about 0.02 to 0.025 parts by weight of amine compound. The amine compound may be incorporated into the chloroprene polymers or precursors at any stage such as added to the monomer solution, dispersed in the short stop composition, added to latex after short stop, mixed with coagulated and recovered polymer and so forth. However, it may be less desirable to add the amine to the monomer composition because the amine may cause an induction period for polymerization or there may be some reaction with polymerization catalyst.

The term "polymers of chloroprene" encompasses polymers in which chloroprene is the major or predominant monomer. Comonomers may also be employed such as 2,3-dichloro-1, 3-butadiene; acrylonitrile, methyl methacrylate and so forth. Usually, the total amount of comonomers will represent no greater than 25 mol percent of the total monomers including chloroprene and preferably will constitute less than 15 mol percent of the total monomers. The polymerization of chloroprene in aqueous emulsion is well known and any such system which does not interfere with the novel characteristics of this invention can be employed. Processes and methods for the polymerization of chloroprene are disclosed, for example, in Encyclopedia of Polymer Science and Technology, Vol. 3, page 705-730 (Interscience, 1965) and in numerous patents such as U.S. Pat. No. 2,264,173 and U.S. Pat. No. 2,264,191 both issued on Nov. 25, 1941. The polymerization may be conducted either batch or continuously.

Conventional emulsifiers may be employed such as the salts of rosins and rosin derivatives such as wood rosin, disproportionated rosin or hydrogenated rosin; ammonium, sodium or potassium salts of long chain fatty acids; nonionic surface active agents such as the ethylene oxide or propylene oxide condensation products of compounds containing reactive hydrogen atoms. Additional emulsifying agents are disclosed in U.S. Pat. No. 2,264,173. Preferably an alkyl sulfate salt is used either during polymerization or at least prior to acidification. The octyl sulfate salts are preferred as replacement for the salts of the condensation product of naphthalene sulfonic acids and formaldehyde.

The alkyl sulfate salts may be any of the alkali metal or ammonium alkyl sulfate salts with the alkyl group having from 8 to 18 carbon atoms but preferably having 8 carbon atoms. Preferred are the sodium, lithium or potassium salts and mixtures thereof with the sodium salts being particularly preferred. The alkyl portion of the emulsifier should preferably be normal but in some instances branch chain sulfates, such as 2-ethyl hexyl, may be employed. However, in order to obtain the maximum benefits of this invention any emulsifier which will be washed out with the wash water should be biodegradable at least to some extent. A preferred emulsifier to be used in conjunction with the alkyl sulfates are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier are disproportionated wood rosins, purified by distillation (sold by the Hercules Powder Company as Resin 731-S or Resin 731-SA).

Emulsifiers may be added at any stage during polymerization or may be fed during polymerization. Alkyl sulfates may be added to the preformed latex either before or after monomer is removed such as by steam distillation. However, because the emulsifiers usually reduce the viscosity of the emulsion during polymerization it is preferred to incorporate alkyl sulfate salts into the recipe prior to or during polymerization. Although the amount of alkyl sulfate is not critical certain properties have been discovered to give superior results and within the range of from about 0.05 to 2.0 parts by weight of the octyl sulfate compound per 100 parts of polymerizable monomers are usually employed with a preferred range being from about 0.1 to 1.0 parts per 100 parts of monomer.

The pH of the aqueous emulsion for polymerization may be varied depending upon the particular emulsification system employed and can be acidic, neutral or alkaline; however, it is preferred to have a pH in the range of about 7 to 13.5. It is also a feature of this invention that preferred results are obtained when the pH is maintained within the range of 10 to 13.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bis-isobutyronitrile and the like. Suitable inorganic peroxides are such as inorganic peracids including persulfates, perborates or percarbonates e.g. ammonium or potassium persulfate and hydrogen peroxide. Water soluble iron salts e.g. ferrous sulfate or iron chelates may be suitably employed. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The usual modifiers, or other agents may be present in the emulsion or added to the polymer at any stage. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide.

Normally, the polymerization would be conducted in an oxygen free or substantially oxygen free atmosphere such as use of an inert gas. However, in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 and 90 percent conversion. The temperature of polymerization may be varied depending upon the particular type of polymer being employed with suitable ranges being from 0° to 90° C. with the preferred range being between 0° C. and 55° C.

The polymerization may be short stopped by the addition of agents such as para-tertiary-butyl catechol and thiodiphenylamine. The process of polymerization may be either continuous or may be conducted in batch.

EXAMPLE 1

Chloroprene polymers are produced with recipes where the salts of the condensation product of naphthalene sulfonic acid and formaldehyde (Commercial condensation products of this type are such as Lomar PW produced by Nopco and Daxad-15 produced by W. R. Grace) either are included or omitted and where the alkylated diarylamines are included or excluded. As indicated in Table I, the standard base recipe is as follows:

| Polymerization Charge | Conc. in parts by Weight |
|---|---|
| Chloroprene | 100 |
| 2,6-ditertiary-butyl paracresol | 0.1 |
| Resin - 731SA[1] | 3.047 |
| Deionized Water | 100 |
| Sodium hydroxide (100 percent) | 0.453 |
| Sodium Sulfite | 0.3 |
| n-dodecyl mercaptan (100 percent) | 0.22 |
| Secondary Emulsifier | As indicated in Table 1 |

| Catalyst System[2] | Conc. in Parts by Weight |
|---|---|
| Water | 2.00 |
| Silver Salt* | 0.0014 |
| Potassium Persulfate | 0.00716 |

| Short Stop Composition | Conc. in Parts by Weight |
|---|---|
| para-tertiary butyl catechol | 0.01 |
| phenothiazine | 0.01 |
| chloroprene | 0.80 |
| sodium dodecyl benzene sulfonate | 0.02 |
| water | 0.80 |
| Secondary Emulsifier | As indicated in Table 1 |

[1] A disproportioned wood rosin, purified by distillation and sold by Hercules Powder Company.
[2] Used as required to maintain desired polymerization rate.
*Sodium anthraquinone-B-sulfonate.

The polymerization is carried out under a nitrogen blanket at a temperature of 40° C. At 70 percent conversion the reaction is short stopped with an emulsion containing t-butyl catechol and phenothiazine. This latex is then steam distilled to remove the unreacted chloroprene. The latex is isolated by coagulation in conventional manner by acidifying to the indicated pH with 10 percent by volume acetic acid solution. In these Examples phm stands for parts by weight per hundred parts of monomer (chloroprene) and ingredients are calculated on a 100 percent active basis. The alkylated diarylamine is the condensation product of diisobutylene and diphenylamine with the product having approximately 87 weight percent dioctyldiphenylamine and 13 percent monooctyldiphenyl amine (Tradename Octamine, manufactured by Naugatuck).

In the Brabender test the minimum torque (meters-gram) is measured and this minimum torque is achieved normally after the ingredients have been mixed. Thereafter, the mixing torque increases and the length of time required to achieve a 100 m-gr. rise in torque is recorded with the longer lengths of time indicating more stable products. The Brabender test is run with a 140° C. temperature in the jacket surrounding the mixing area.

As is conventional a portion of the secondary emulsifier is incorporated with the short stop composition to aid in the dispersion of short stop. The portion of the emulsifier added to the polymerization recipe is incorporated in the initial charge to the reactor.

Examples 1 and 2 illustrate that the polymers using Lomar PW gives excellent stability with the time being at least 25 minutes even for aged samples. Example 3 illustrates the poor stability of polymers in the absence of the naphthalene condensation salts with the time to give 100 m-gr. rise being only 14 on the aged sample. Example 4 is compared with Example 3 and illustrates this invention where the time to give 100 m-gr. rise is increased from 14.0 to 40.0 minutes. Example 6 is compared to Example 5 to show that a lower concentration of alkylated diarylamine increased the stability from 15 to 29.5 minutes. Example 7 illustrates the poor stability of a latex isolated at pH of 5.8 in the absence of the naphthalene sulfonic acid salts. Example 8 is compared to Example 7 and illustrates that a standard antioxidant is essentially ineffective in increasing the stability.

TABLE I

| Example | Naphthalene Sulfonic Cond. Product type | phm in Poly. Chg. | phm in Short Stop | Isolation pH | Additive (parts per 100 polymer) | Unaged Min. Torque | Unaged Time to 100 m-gr Rise | Aged 10 days at Room T. Min Torque | Aged 10 days at Room T. Time to 100 m-gr Rise |
|---|---|---|---|---|---|---|---|---|---|
| 1 | Lomar PW* | .70 | .01 | 5.8 | 0 | 1325 | 30+ | — | 25.0 |
| 2 | Lomar PW | .70 | .01 | 6.3 | 0 | 1275 | 30+ | — | 36.0 |
| 3 | None | 0 | 0 | 6.3 | 0 | 1350 | 28.5 | — | 14.0 |
| 4 | " | 0 | 0 | 6.3 | .1 alkylated dairylamine | — | — | — | 40.0 |
| 5 | " | 0 | 0 | 6.3 | 0 | 1375 | 32+ | — | 15.0 |
| 6 | " | 0 | 0 | 6.3 | .025 alkylated dairylamine | — | — | — | 29.5 |
| 7 | " | 0 | 0 | 5.8 | 0 | 1375 | 30+ | — | 13.0 |
| 8 | " | 0 | 0 | 5.8 | .1 2,6 Ditertiary butyl | | | | |

TABLE I-continued

| Example | Naphthalene Sulfonic Cond. Product type | phm in Poly. Chg. | phm in Short Stop | Isolation pH | Additive (parts per 100 polymer) | Unaged Min. Torque | Unaged Time to 100 m-gr Rise | Aged 10 days at Room T. Min Torque | Aged 10 days at Room T. Time to 100 m-gr Rise |
|---|---|---|---|---|---|---|---|---|---|
| | | | | | paracresol (BHT) | — | — | — | 15.5 |

*Lomar PW is the sodium salt of the condensation product of naphthalene sulfonic acid with formaldehyde.
Note:
Example 3-8 had sodium octyl sulfate added to prevent coagulation of the latex because of the absence of the Lomar PW. with .413 phm in the polymeriaztion charge and either .01 phm (Ex. 3, 4, 7, 8) or .004 phm (Ex. 5, 6) in the short stop.

EXAMPLES 9-13

Comparative runs are made to show the effect of various compounds on Brabender Stability. A standard chloroprene recipe is employed and various additives are added.

TABLE II

| Example | Additive, phm | Unaged Min. Torque | Unaged Time to 100 m-gr. Rise | Aged 5 days at 70° C. Min torque | Aged 5 days at 70° C. Time to 100 m-gr. Rise |
|---|---|---|---|---|---|
| 9 | 0 | 1400 | 14 | 1475 | 15 |
| 10 | .1 Alkylated Diarylamine[1] | 1350 | 52 | 1425 | 36 |
| 11 | .1 Alkylated Diarylamine[2] | 1425 | 37 | 1425 | 30 |
| 12 | .1 Antioxidant-2246[3] | 1430 | 21 | 1475 | 19.5 |
| 13 | .2 BHT[4] | 1400 | 19 | 1440 | 14.0 |

[1]Octamine
[2]Agerite Staylite S
[3]2,2 Methylene bis (4-methyl-6 butyl phenol)
[4]2,6 Ditertiary butyl paracresol From a comparison of Examples 10 and 11 with Examples 12 and 13 it may be seen that the alkylated diarylamines are much more effective than the Antioxidant 2246 and the BHT both of which are widely used stabilizers for chloroprene polymers.

EXAMPLES 14 and 15

To illustrate that the sulphate ion is not causing poor stability, 0.25 parts of $(NH_4)_2SO_4$ per hundred polymer is incorporated into a standard neoprene during mastication and compared with a control. The composition containing the $(NH_4)_2SO_4$ required 21.0 minutes to give a 100 m-gr. rise (after aging 10 days at room temperature) as compared to 21.5 minutes for the control.

The invention claimed is:

1. In a process for preparing polymers of chloroprene by emulsion polymerization using from about 0.05 to 2.0 parts by weight per 100 parts of polymerizable monomers of an octyl sulfate emulsifying agent selected from the group consisting of alkali metal octyl sulfates, ammonium octyl sulfates and mixtures thereof and washing of the resultant polymer with water to remove soluble emulsifying agents, the improvement comprising using as a stabilizer an alkylated diaryl amine.

2. The process of claim 1 wherein the said alkylated diaryl amine is an alkyl phenyl amine.

3. The process of claim 1 wherein the said alkylated diaryl amine is an octyl phenyl amine.

4. The process of claim 1 wherein the said alkylated diaryl amine is a mixture of monoalkyl diphenyl amine and dialkyl diphenyl amine.

5. The process of claim 1 wherein the said alkylated diaryl amine is a mixture of monooctyl diphenyl amine and dioctyldiphenyl amine.

6. The process of claim 1 wherein the said alkyl groups each have from one to 12 carbon atoms.

7. The process of claim 1 wherein said alkylated diaryl amine is present in an amount of from 0.005 to 2.0 parts by weight per 100 parts by weight of said chloroprene polymers.

8. The process according to claim 1 carried out without using salts of the condensation products of naphthalene sulfonic acids and formaldehyde.

9. The process of claim 8 wherein said octyl sulfate emulsifying agent is an alkali metal octyl sulfate.

10. The process of claim 9 wherein the said polymerization is conducted employing as an emulsifying agent a disproportioned wood rosin.

* * * * *